United States Patent
Gilmour et al.

(10) Patent No.: US 8,209,596 B1
(45) Date of Patent: Jun. 26, 2012

(54) INTEGRITY MONITORING SYSTEM

(75) Inventors: Paul A. Gilmour, Bloomfield, NJ (US); Gene L. Cangiani, Parsippany, NJ (US)

(73) Assignee: Exelis Inc., McLean, VA (US)

( * ) Notice: Subject to any disclaimer, the term of this patent is extended or adjusted under 35 U.S.C. 154(b) by 358 days.

(21) Appl. No.: 12/718,752

(22) Filed: Mar. 5, 2010

(51) Int. Cl.
*G06F 7/02* (2006.01)

(52) U.S. Cl. .................................. 714/819; 342/357.45

(58) Field of Classification Search .................. 370/342; 375/270, 148; 342/357.44, 464, 357.45; 702/116; 714/814, 819
See application file for complete search history.

(56) References Cited

U.S. PATENT DOCUMENTS

| | | | |
|---|---|---|---|
| 6,282,184 B1 * | 8/2001 | Lehman et al. ............... | 370/342 |
| 6,351,500 B2 * | 2/2002 | Kumar ......................... | 375/270 |
| 6,429,808 B1 * | 8/2002 | King et al. ............... | 342/357.44 |
| 6,462,707 B1 | 10/2002 | Clark | |
| 6,654,408 B1 * | 11/2003 | Kadous et al. ............... | 375/148 |
| 6,782,330 B1 | 8/2004 | Clark | |
| 6,882,314 B2 * | 4/2005 | Zimmerman et al. ........ | 342/464 |
| 6,992,617 B2 * | 1/2006 | Diggelen et al. ......... | 342/357.45 |
| 7,400,292 B2 * | 7/2008 | DiLellio .................. | 342/357.31 |
| 7,589,667 B2 * | 9/2009 | van Diggelen et al. .. | 342/357.45 |
| 7,596,465 B2 * | 9/2009 | Ristau et al. .................. | 702/116 |

OTHER PUBLICATIONS

Gary McGraw, Rockwell Collins, and Tim Murphy, "Safety of Life Considerations for GPS Modernization Architectures", Ion GPS 2001, Sep. 11-14, 2001, Salt Lake City, UT, pp. 632-640.

* cited by examiner

*Primary Examiner* — David Ton
(74) *Attorney, Agent, or Firm* — Edell, Shapiro & Finnan, LLC (57) ABSTRACT

An integrity monitoring system (IMS) monitors data upload errors, internal data processing errors, clock faults, and transmit signal distortions in a transmitter system. The IMS includes a receiver with an A/D converter that under-samples a multi-band RF signal to produce a composite, aliased IF digital signal. Individual signals are extracted from the composite signal via correlation with the appropriate spreading code. The resulting signals are evaluated to determine whether any signal distortion is present in the RF signals being transmitted, and data is extracted from the signals to perform checks of data uploaded to the transmitter system and data present in the transmitted RF signals that was generated within the transmitter system. The IMS also checks for clock faults in the transmitter system without requiring an independent timing reference by using clock phase information provided by the transmitter system's time keeping system.

24 Claims, 8 Drawing Sheets

INTEGRITY MONITORING SYSTEM

BACKGROUND

To operate effectively, navigation systems that rely on Global Position System (GPS) signals require signal faults within the system to be minimized. In particular, the probability of transmitting Misleading Signal in space Information (MSI) must be kept low for all signals transmitted by GPS space vehicles. MSI is defined as a User Range Error (URE) significantly greater than the broadcast User Range Accuracy (URA) bound that persists for a specified time period without the space vehicle switching to Non-Standard Code (NSC).

Figure 1:
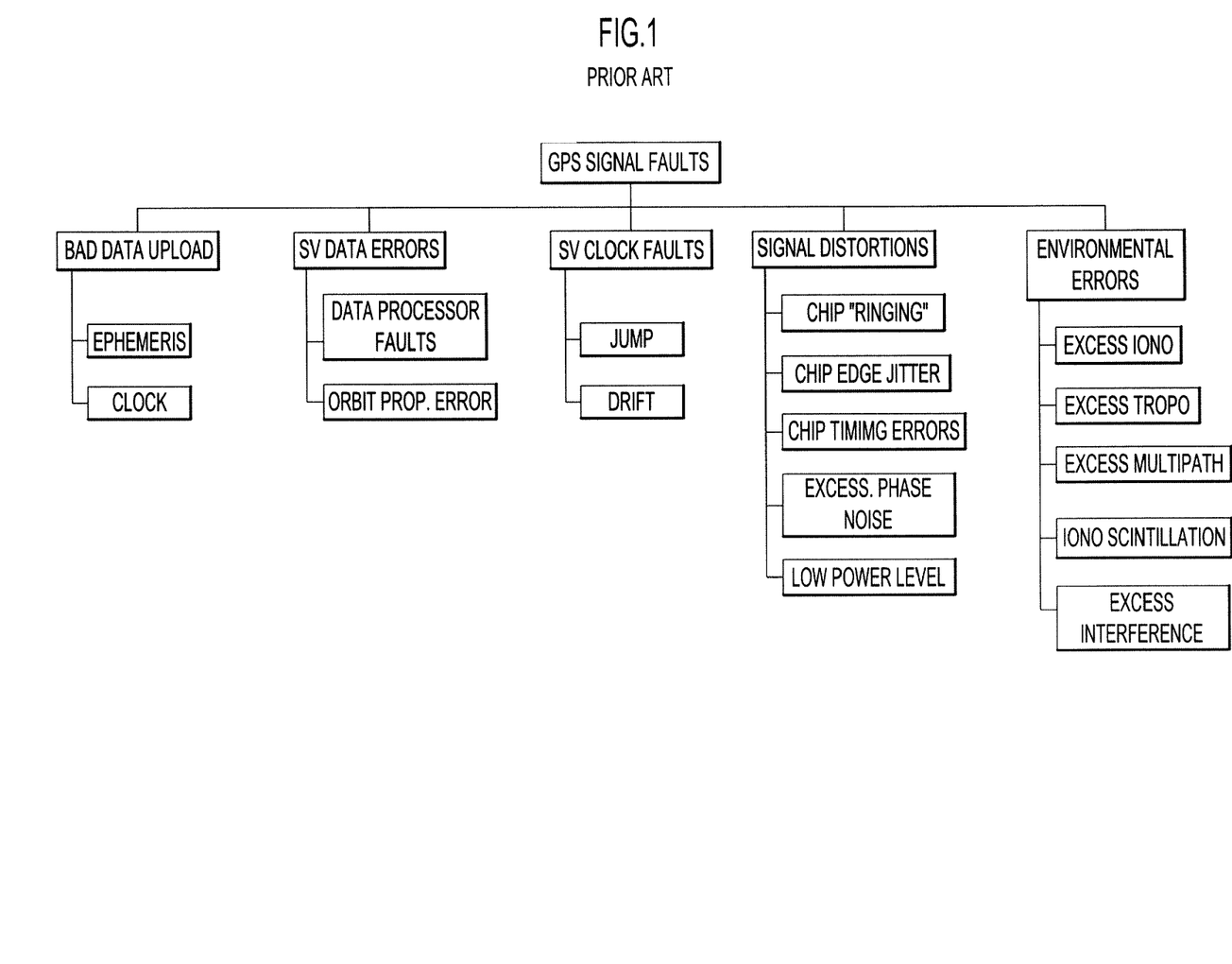
FIG. 1 is a diagram of a fault tree of GPS signal faults that can result in misleading signals in space information (MSI).

FIG. 1 shows a fault tree of possible GPS signal faults that can result in MSI, based on: Dr. Gary McGraw et al., Boeing Air Traffic Management, "Safety of Life Considerations for GPS Modernization Architectures," ION GPS 2001, 11-14 Sep. 2001, Salt Lake City, Utah. These signal faults are grouped in the following categories: bad data upload; space vehicle data errors; space vehicle clock faults; signal distortions; and environmental errors. Bad data upload errors include errors in ephemeris and clock data received from ground stations. Space vehicle data errors include data processor faults and orbit propagation errors that occur within the space vehicle. Space vehicle clock faults include clock signal jumps and drifts within the space vehicle. Signal distortions include chip "ringing," chip edge jitter, chip timing errors, excessive noise phase, and low power levels. Environmental errors include a variety of errors caused by atmospheric conditions and well as multipath and other types of interference.

A GPS On-Board Integrity Monitoring System (IMS) can be employed to assure that the probability of transmitting misleading signal in space information (MSI) shall be low for all signals that the GPS space vehicle transmits. One approach is to provide an IMS that uses a full GPS receiver to monitor the transmitted signals for signal distortions and clock faults. The data that the space vehicle Mission Data Unit (MDU) intended to transmit is compared with the data that the IMS receives from the actual transmitted signal. Some form of "reasonableness" check of the data uploaded from the ground stations and of the ephemeris data propagated by the MDU can be performed.

The full GPS receiver used for this purpose would be based on existing receiver designs, which have RF front ends that are unnecessarily complicated for an on-orbit IMS. In order to monitor GPS military signals, such an IMS might employ an embedded COMSEC device, which greatly increases the complexity of the device and requires COMSEC certification. Moreover, in order to determine the integrity of clock signals, such an IMS could use a high-accuracy clock source to check the clock signals of the on-board time keeping system. This independent timing reference would add complexity, power, and weight to the receiver. Further, the "reasonableness" check of the data uploaded from the ground stations and of the ephemeris data propagated by the MDU may not provide strong integrity assurance, and therefore a higher degree of integrity assurance on the MDU and its software may be required.

Accordingly, there remains a need for an integrity monitoring system with minimal weight, cost, power consumption, and complexity that can readily be incorporated into a transmitter system to be monitored, such as a GPS space vehicle. Moreover, other types of signal transmission systems could benefit from an enhanced capability to monitor data upload errors, system data errors, clock faults, or signal distortion.

SUMMARY

The Integrity Monitoring System (IMS) described herein provides a compact, light-weight, and cost-efficient solution to monitoring data upload errors, internal data processing errors, clock faults, and transmit signal distortions in a transmitter system, such as a space vehicle used for satellite navigation, and overcomes the disadvantages associated with employing a full receiver for this purpose. In the context of a satellite navigation space vehicle, the IMS can be implemented as an on-board subsystem, e.g., resident on a single board or plug-in card that plugs into a slot of a mission data unit (MDU) of the system.

The IMS can employ a simplified RF front end which under-samples a locally-generated, multi-band RF signal (e.g., a composite signal containing all GPS L-band signals) using a single analog-to-digital (A/D) converter to produce a composite, aliased IF digital signal. Individual signals are extracted from the composite digital signal using baseband digital logic via correlation with the appropriate spreading code. The resulting signals can be evaluated to determine whether any signal distortion is present in the RF signals being transmitted, and data can be extracted from the signals to perform checks of data uploaded to the transmitter system as well as data present in the transmitted RF signals that was generated within the transmitter system.

The IMS also checks for clock faults in the transmitter system without requiring an independent timing reference (i.e., the IMS does not include a separate oscillator or clock signal source of its own). The IMS receives clock phase information from the transmitter system's Time Keeping System (TKS) and performs redundant computations with this information that can be used to check the integrity of the TKS clocks.

Where the transmitter system employs crypto or code generators, no crypto or code generators are required in the IMS. The crypto and code generators used elsewhere within the transmitter system provide the necessary spreading sequences and interleaving information to the IMS. Therefore, the IMS does not need to have its own crypto or code generator and does not need COMSEC certification or cryptographic keying.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

The Integrity Monitoring System (IMS) described herein provides a compact, light-weight, cost-efficient solution to monitoring a space vehicle used for satellite navigation (e.g., satellites used in the GPS, Galileo, or GLONASS systems) and overcomes the aforementioned disadvantages associated with employing a full receiver for this purpose. More generally, aspects of the described IMS can be employed in any transmitter system that can benefit from monitoring of one or more of: data upload errors, internal data processing errors, clock faults, and signal distortions within transmitted signals.

In the context of a satellite navigation space vehicle, the IMS can be implemented as an on-board subsystem, and the purpose of the satellite navigation on-board IMS is to assure that the probability of transmitting misleading signal in space information (MSI) is low for all signals that the satellite navigation space vehicle transmits. Any one or any combination of the following features can be employed in an IMS according to the invention in order to detect a variety of clock faults, data faults, and/or signal distortions.

To check for signal distortions in signals being transmitted, the IMS can employ a simplified RF front end comprising a single analog-to-digital (A/D) converter. In the case of a GPS satellite navigation space vehicle, the single A/D converter is used to simultaneously sample all L-Band frequencies (L1, L2, and L5). No hardware mixers are required, because under-sampling is used to alias all the GPS L-band frequencies to low IF frequencies. Signals are separated using baseband digital logic via correlation with the appropriate spreading code.

In signal transmission systems where crypto or code generators are used, no crypto or code generators are required in the IMS. The crypto and code generators used elsewhere within the signal transmission system provide the necessary spreading sequences and interleaving information to the IMS. Therefore, the IMS does not need to have its own crypto or code generator. Consequently, the IMS does not need COMSEC certification or cryptographic keying.

Further, no independent timing reference is required in the IMS in order to check for clock faults. The IMS first checks the integrity of the on-board Time Keeping System (TKS) clocks, and then uses this clock as its timing reference. Consequently, the IMS does not require its own independent timing reference. The clock integrity checking is performed by having the TKS phase meter hardware automatically forward readings to the IMS (no TKS software involvement is needed). This allows the IMS to check the integrity of the TKS clock via phase comparisons among the three independent timing sources in the TKS, which include, for example, a voltage-controlled crystal oscillator (VCXO), a rubidium atomic frequency standard (AFS), and an oven-compensated crystal oscillator (OCXO).

The IMS is designed to perform rigorous checks of data uploaded to the GPS space vehicle from ground stations and of the ephemeris data propagated by the mission data unit (MDU) without requiring state vector propagation. The design uses a simple but rigorous "bootstrapping" approach that compares prior validated data with the newly received or generated data. This approach does not require any integration of state vector information to propagate the data forward.

An example application for the IMS is a subsystem for on-board monitoring of navigation payload functions on future generations of Global Positioning System (GPS) satellites to prevent broadcast of misleading system information (MSI). Referring again to FIG. 1, potential GPS system faults that could result in MSI and that can be addressed by the IMS fall into three categories: timing errors (clock faults), erroneous data (either uploaded from ground facilities or generated on-board), and distortions of the broadcast RF signals. Environmental errors must generally be addressed by ground monitoring or receiver autonomous integrity monitoring (RAIM). The following examples describe how each of these error types can be detected by an on-board IMS. Whenever one of these faults is detected, the IMS will command a switch to non-standard code (NSC) for the affected signal, precluding continued use of that signal. The data flow graph figures that accompany the following description, therefore, show arrows to "NSC" as the IMS outputs.

Figure 2:
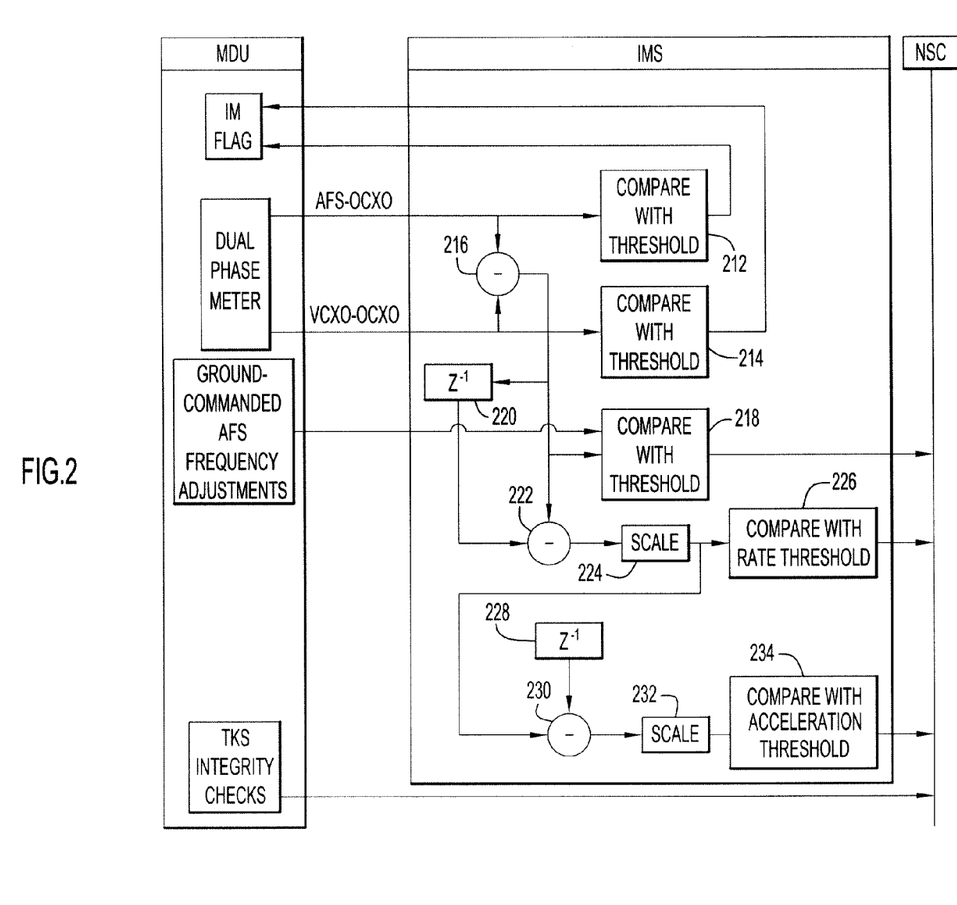
FIG. 2 is a functional block diagram showing an example of signal flow and processing in an integrity monitoring system (IMS) to detect clock faults and system timing errors.

FIG. 2 illustrates operations performed by the IMS and signal flow between the mission data unit (MDU) and IMS relating to detection of system timing errors, such as clock faults. The operations described in connection with FIG. 2 can be performed by a timing integrity module of the IMS, which can be implemented with a processor of the IMS, such as processor 518 shown in FIG. 5. The navigation payload of the mission data unit (MDU) employs two main clocks to generate the system timing, and a dual phase meter to measure phasing errors between each of the main clocks and a third operational clock. A Voltage Controlled Crystal Oscillator (VCXO) clock operating at 10.23 MHz, for example, is used for timing throughout the MDU. The VCXO clock is very stable over the short-term (e.g., over several seconds) and provides a very clean crystal signal; however, the VCXO tends to drift over longer periods of time. The Atomic Frequency Standard (AFS) clock is a very high accuracy clock that is stable over a long period of time. To prevent drifts, the VCXO clock is locked to the AFS clock. An Oven-Controlled Crystal Oscillator (OCXO) clock is used to generate phase differences with each of the VCXO and AFS clocks. Phase meters that compare the phases of two oscillator signals tend to work better if there is a highly non-integer relationship between the two clocks being measured. If the AFS and VCXO clocks happen to have similar or related integer frequencies, phase cannot be measured accurately using the phase difference of these two clocks. The frequency of the OCXO clock is selected to be non-integer to the AFS clock and non-integer to the VCXO clock. Consequently, the AFS and VXCO clocks can have any frequencies (e.g., both can be 10.23 MHz clocks), and the phases of these clocks can still be measured very accurately.

The MDU performs Time Keeping System (TKS) integrity checks to ensure proper operation of the timing system. In this example, the MDU is primarily concerned with monitoring three aspects of the VCXO and AFS clocks: 1) the phase of the clock signals, which is directly related to the resulting position measurement in a GPS receiver; 2) the rate at which the clock is drifting off, which produces a velocity error at the GPS receiver; and 3) the acceleration of clock drift, which produces an acceleration error at the GPS receiver. If any of these values exceeds an acceptable level, the MDU commands a switch to non-standard code (NSC), as shown in FIG. 2.

The timing integrity processing performed by the IMS essentially performs redundant computations to those performed in the MDU to determined whether phases, phase velocities, and phase accelerations are within acceptable levels. As shown in FIG. 2, the dual phase meter of the MDU sends the phase difference of the AFS and OCXO clocks (AFS–OCXO) and the phase difference of the VCXO and OCXO clocks (VCXO–OCXO) to the IMS. The IMS compares each of these phase differences with a threshold (operations 212 and 214) and sends an Integrity Monitoring (IM) flag back to MDU if either of the phase differences exceeds a threshold. The comparisons performed in operations 212 and 214 permit the IMS to isolate a "bad" clock, because the phase measurement associated with the "bad" clock will exceed the threshold, while the other one will not.

The IMS timing integrity processing also computes the difference between the two phase signals received from the MDU (represented by difference operator 216 in FIG. 2) to obtain a third derived phase measurement between the two main clocks. In operation 218, this difference is also compared with a threshold to determine if there is a timing error large enough to cause MSI. If so, the IMS generates a signal commanding a switch to non-standard code (NSC), as shown in FIG. 2. Note that the MDU also passes to the IMS any AFS frequency offset commands it receives from the ground Control Segment. The Control Segment periodically issues such commands to correct frequency drift it observes in the AFS. Ground-commanded frequency offsets of the AFS are of course not integrity faults.

To detect timing velocity errors, successive phase measurement differences are differenced. This operation is depicted in FIG. 2 with a $z^{-1}$ operator 220, which represents a delay (buffering) operation, such that difference operator 222 generates a difference between successive phase measurement differences. A scale operation 224 is performed on the resulting timing velocity error measurement, which is then compared with a rate threshold in operation 226. If the scaled timing velocity error measurement exceeds the threshold, the IMS generates a signal commanding a switch to non-standard code (NSC).

Similarly, successive velocity measurements are differenced (likewise depicted in FIG. 2 with a $z^{-1}$ operator 228 and difference operator 230) to produce a timing acceleration error measurement, which is appropriately scaled (operator 232) and compared with an acceleration threshold (234). If the scaled timing acceleration error measurement exceeds the threshold, the IMS generates a signal commanding a switch to non-standard code (NSC).

Notably, the IMS does not include or require an independent timing reference, such an oscillator or clock of its own, in order to check the integrity of the MDU clock signals. The IMS monitors the integrity of the timing operations of the MDU without use of a separate or independent clock by employing the phase signals (AFS–OCXO) and (VCXO–OCXO) provided by the MDU. The absence of a clock or oscillator in the IMS reduces the size, weight, and cost of the IMS.

Figure 3:
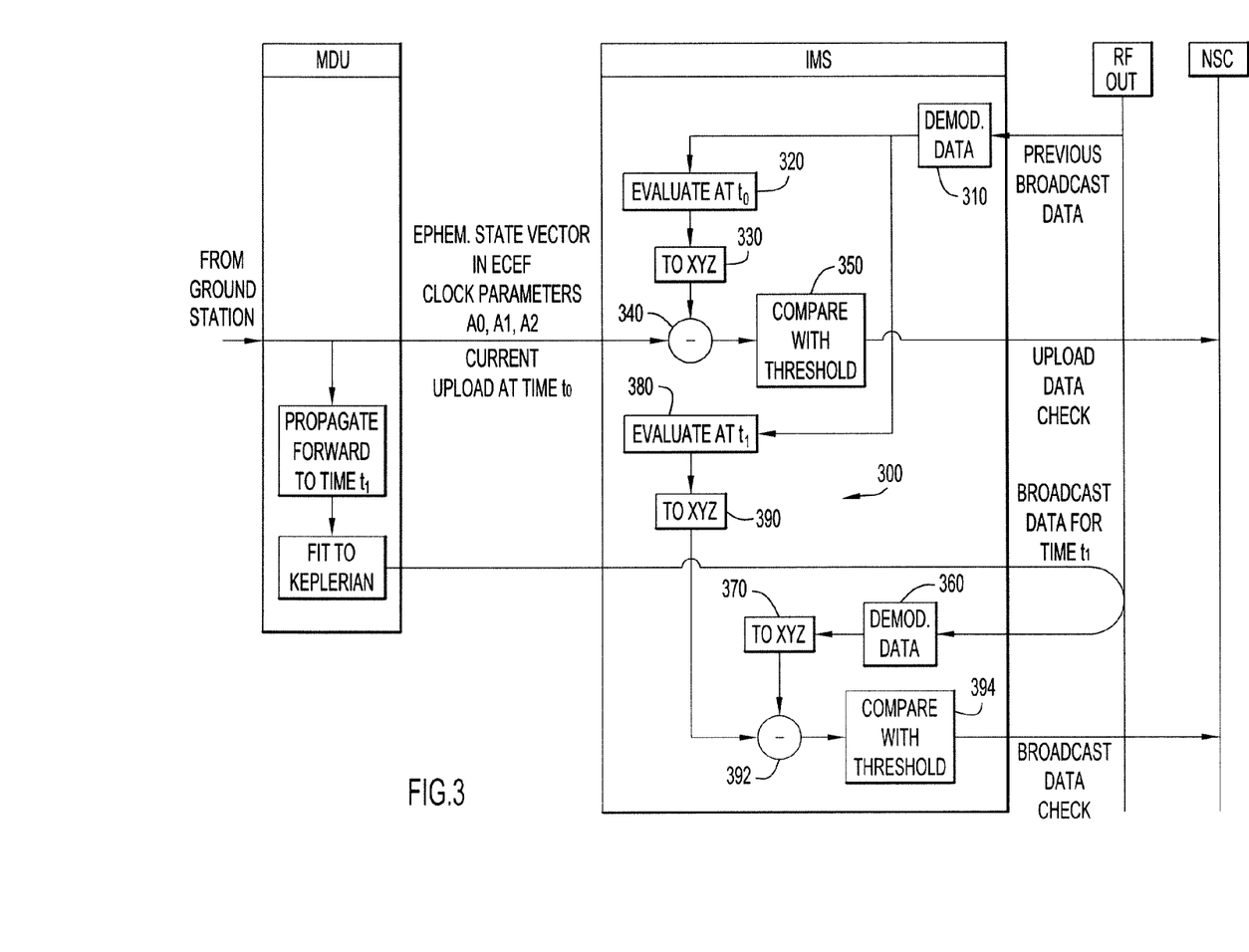
FIG. 3 is functional block diagram showing an example of signal flow and processing in an IMS to detect upload and broadcast data faults.

FIG. 3 illustrates signal flow involving the IMS and operations performed by the IMS to detect data errors. The operations described in connection with FIG. 3, referred to collectively by reference numeral 300, can be performed by a data integrity module of the IMS, which can be implemented with a processor of the IMS, such as processor 518 shown in FIG. 5. Clock correction data and satellite position information (ephemeris data) are broadcast to users from the GPS satellites, and errors in either of these can result in MSI. The basic data is generated in ground facilities and uploaded to the GPS satellites, where the data is processed and propagated in time. The IMS data integrity processing can check both the upload data and the on-board processing of that data for reasonableness and consistency, within the IMS bounds. Navigation payload propagation and formatting of the ephemeris data is checked for consistency with the upload data by demodulating the broadcast data and comparing it with the most current upload, evaluated at the broadcast interval.

More specifically, satellite position and dynamics parameters are estimated in the ground facilities and the resultant state vector from a Kalman filter is periodically uploaded to the satellite. The state vector consists of satellite position, velocity, and acceleration in rectangular, earth-centered, earth-fixed (ECEF) Cartesian coordinates (XYZ), as well as some driving force parameters.

The clock correction data uploaded from the ground station to the GPS satellite includes clock parameters $a_0$, $a_1$, and $a_2$ representing satellite clock bias, drift, and drift rate, respectively. These parameters can be used to compute satellite clock bias as a function of time relative to the satellite clock reference epoch $t_0$ and are part of the broadcast message. As shown in FIG. 3, the received clock correction data and satellite position information are received by the MDU and forwarded to the IMS.

In order to broadcast the satellite position data to users, the satellite MDU propagates the state vector forward in time from a current upload time $t_0$ to a current broadcast time $t_1$ by integrating the equations of motion in Cartesian coordinates. The MDU then converts the propagated state vector to Keplerian-type parameters and supplies the parameters to the RF transmission system for broadcast to the users, as shown in FIG. 3.

The data integrity monitoring shown in FIG. 3 can begin after the first upload is declared valid via ground measurements, and from that point forward, the IMS uses a "bootstrap" technique to validate each successive upload by checking for consistency with the previous validated upload. The IMS data integrity monitoring involves two types of checks: newly uploaded data (position and clock correction data) is compared with previously-broadcast data for reasonableness and consistency; and broadcast data (position and clock correction data) generated via on-board processing is compared with previously-broadcast data for reasonableness and consistency. FIG. 3 shows the operations performed by the IMS to check the uploaded position data and to check the broadcast position data for on-board processing errors (processor faults).

In order to evaluate the consistency of the current upload, the IMS compares the uploaded data with recently broadcast data. In particular, a portion of the RF broadcast signal is tapped off and supplied to the IMS. As described in greater detail below, the IMS includes a demodulator that demodulates (310) the tapped-off RF broadcast signal, and the satellite position data contained in the RF broadcast signal is recovered. Upon receipt of upload satellite position data at time $t_0$, the previously-transmitted satellite position (ephemeris) data recovered from the RF broadcast signal is evaluated at time $t_0$ (320) to provide an indication of the satellite position at time $t_0$ according to the previously-broadcast ephemeris data. As previously noted, the satellite position data is broadcast in Keplerian terms; thus, the satellite position determined by propagating the previously-broadcast position data to time $t_0$ is also in Keplerian terms. To compare this position to the satellite position from the uploaded ephemeris state vector, the satellite position from the RF broadcast message, evaluated at time $t_0$ is converted from Keplerian terms to ECEB Cartesian coordinates (XYZ) (330).

As indicated by the difference operator (340) in FIG. 3, the three position coordinates of the satellite position from the RF broadcast message (propagated to time $t_0$) are compared to (subtracted from) the three position coordinates of the uploaded ephemeris state vector, and the resulting position differences are evaluated to determine whether the position offset is within acceptable levels. For example, each of the three coordinate differences can be compared to a threshold, or an offset distance can be computed between the positions indicated by the upload position data and the broadcast position data (e.g., the square root of the sum of the squares of the differences of the three coordinates) and compared to a single threshold. If the distance between satellite position from the previous broadcast and the satellite position from the upload data exceeds the threshold, it is determined that the upload data is erroneous, and the IMS generates a signal commanding a switch to non-standard code (NSC). Optionally, velocity and acceleration states can also be checked in this manner.

To check the integrity of the currently-broadcast data, the tapped-off RF broadcast signal containing the satellite position for current broadcast time $t_1$ is demodulated (360) and converted from Keplerian terms to ECEB Cartesian coordinates (XYZ) (370). In the absence of processing errors, the resulting satellite position should be essentially the same as that computed by the MDU when the upload data was propagated forward to time $t_1$. The previously-transmitted satellite position data recovered from the previous RF broadcast signal is evaluated at time $t_1$ (380) to provide an indication of the satellite position at time $t_1$ according to the previously-broadcast data. Note that this is the same broadcast satellite position data employed in checking the upload position data, but in this case the previous broadcast position data is evaluated at time $t_1$ instead of time $t_0$.

The previously-broadcast position data evaluated at time $t_1$ is converted from Keplerian terms to ECEB Cartesian coordinates (XYZ) (390), and the three position coordinates of the satellite position from the previous RF broadcast message (propagated to time $t_1$) are compared to (subtracted from) the three position coordinates of the satellite position from the current RF broadcast message at time $t_0$, as indicated by the difference operator (392). The resulting differences are evaluated to determine whether the position offset is within acceptable levels (394). Here again, each of the three coordinate differences can be compared to a threshold, or an offset distance metric between the position indicated by the current broadcast data and the position indicated by the forward-propagated previous broadcast data can be computed and compared to a single threshold. If the distance between the satellite position from the forward-propagated previous broadcast and the satellite position from the current broadcast exceeds the threshold, it is determined that the broadcast data is erroneous (e.g., due to some on-board processing error), and the IMS generates a signal commanding a switch to non-standard code (NSC). Optionally, velocity and acceleration states can also be compared.

Although not explicitly shown in FIG. 3, the clock correction data is checked in the same way as the ephemeris data, except that the process is much simpler, since no coordinate conversions are required. In particular, to check the integrity of uploaded clock data, the previously-broadcast clock correction data is extracted from the demodulated tapped-off RF broadcast signal, evaluated at time $t_0$, and compared to the upload clock correction data. If the difference exceeds a selected threshold, and the IMS generates a signal commanding a switch to non-standard code (NSC). To check the integrity of the current broadcast clock correction data, the current broadcast clock correction data is extracted from the demodulated tapped-off RF broadcast signal and compared to the previous broadcast clock correction data evaluated at time $t_1$. If the difference exceeds a selected threshold, the IMS generates a signal commanding a switch to non-standard code (NSC).

As will be appreciated from the foregoing description, the data integrity checking performed by the IMS essentially relies on a "bootstrapping" or cascading scheme in which broadcast position and clock correction data initially validated by ground measurements can be used to begin a sequence of on-board validations, wherein each successive set of upload data and broadcast data is checked for consistency with the previously validated upload data and broadcast data.

Figure 4:
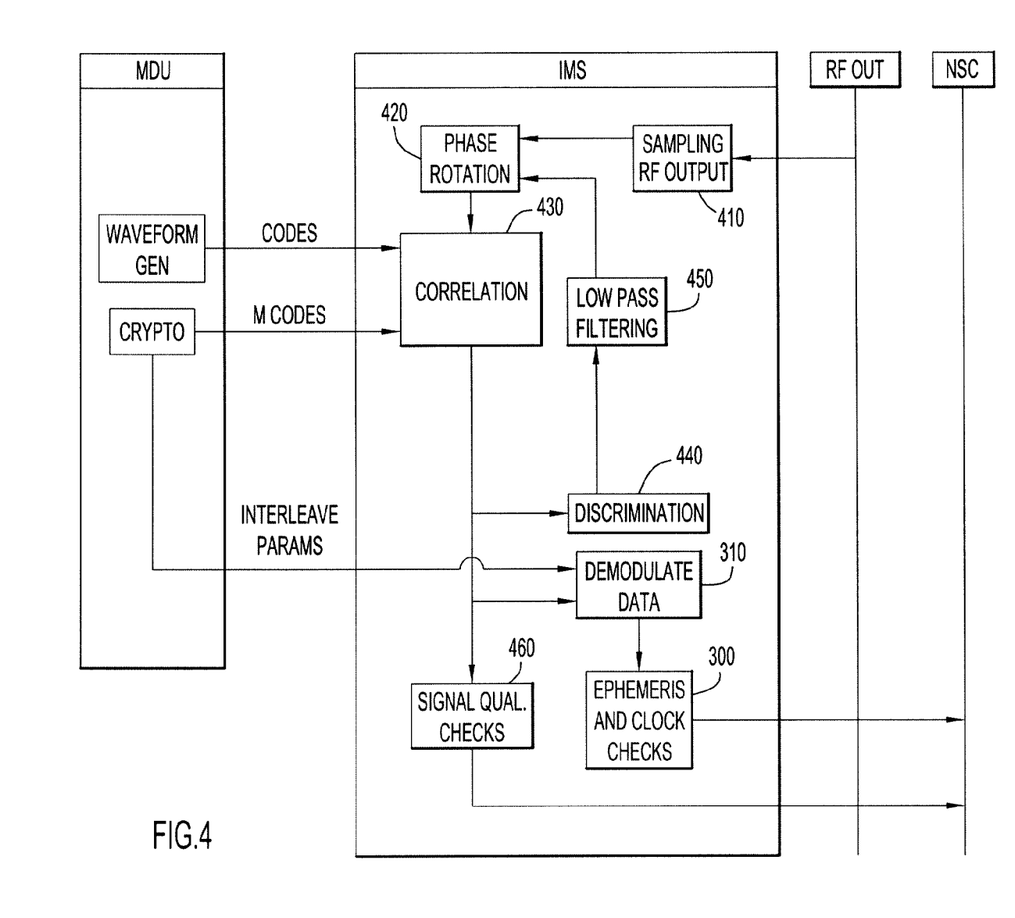
FIG. 4 is a functional block diagram showing an example of signal flow and processing in an IMS to detect signal distortion faults.

FIG. 4 illustrates signal flow involving the IMS and operations performed by the IMS to receive and process a tapped-off portion of the RF broadcast signal and to detect signal distortions in the transmitted signal. The operations described in connection with FIG. 4 can be performed by a receiver and signal integrity module of the IMS, which can be implemented with a receiver and processor of the IMS, such as those shown in FIG. 5 and described below.

As explained below in the detailed description of the correlation processing, the IMS receiver combines the RF outputs into a composite RF signal and under-samples the resultant signal (operation 410 in FIG. 4) using a single analog-to-digital (A/D) converter. The sampling frequency is chosen such that each RF carrier is aliased into a compact range of convenient IF frequencies. Each of the individual carriers is then brought down to baseband using phase rotation (420) by one of a set of phase rotators. The resultant baseband signals are correlated (430) with each of the codes using a series of complex correlators. The correlators employ waveform codes supplied by the waveform generator of the MDU as well as M codes supplied by the crypto unit of the MDU. The correlator outputs are used to generate a feedback signal to control the phase rotators, thereby closing the tracking loop and maintaining code and carrier phase lock on each signal. In particular, a discriminator comprising a phase-locked loop (PLL) performs phase discrimination (440), and the discriminator output is low-pass filtered (450) and then supplied to the phase rotators to keep the phase rotators at the correct phases.

Sign changes in the correlator outputs correspond to data bit transitions and are utilized to demodulate the data streams (310) for ephemeris and clock checking (300), as previously indicated in FIG. 3. The M code interleave parameters required to demodulate the data are supplied to the demodulator by the crypto unit of the MDU, as shown in FIG. 4.

By way of an example, the correlation process (430) can employ seven correlators for each code, one prompt correlator and three pairs of early-late correlators at various spacings. As is known in the art, signal distortions that can lead to MSI can be detected by performing a series of tests on the outputs of these seven correlators. Signal Quality Monitoring (SQM) algorithms utilize these tests to perform signal quality checks (460) to detect occurrences of failures that could result signal distortions severe enough to cause MSI. The SQM algorithms implemented in the IMS are well known to those skilled in the art and are not described herein. If the signal quality checks (460) result in a determination that signal distortions are severe enough to cause MSI, the IMS generates a signal commanding a switch to non-standard code (NSC).

A significant simplification to the IMS is the fact that the crypto and code generators used in the MDU provide the necessary spreading sequences and interleaving information to the IMS such that the IMS does not require a separate set of cryptographic logic. As shown in FIG. 4, the MDU includes a waveform generator and cryptographic unit that provide the spreading codes required to perform correlation (i.e., the EC-L1-CA, EC-L1-P, EC-L1-CP, EC-L1-CD, EC-L2-C, EC-L2-P, EC-L5-I, EC-L5-Q, M-L1, and M-L2 codes).

Signal distortion can result from a variety of causes, such as hardware failures. For example, failure of a power amplifier can produce significant signal distortion. Such distortions may be relative easy to detect and compensate for at ground-based monitoring stations that have highly sensitive receivers. However, some less sophisticated receivers more typically used by consumers may not be able to discern such signal distortions and may produce wildly inaccurate position information as a result. The signal distortion monitoring performed by the IMS immediately detects such distortions at the source and permits rapid correction of the problem before such errors develop in ground-based receivers.

For descriptiveness, a timing integrity module, a data integrity module, and a signal integrity module of the IMS have been described as performing the operations illustrated in FIGS. 2-4, respectively. However, it will be appreciated that the invention is not limited to any particular device architecture or arrangement. For example, the modules can be implemented with one or more processors, which need not be physically separate or distinct units or processors. Further, the operations and methodologies described herein can be carried out by executing instructions stored on a computer readable medium (i.e., software) on a processor or processors located within the IMS. As used herein, the term "computer readable medium" refers to tangible media (e.g., memory or storage devices).

Figure 5:
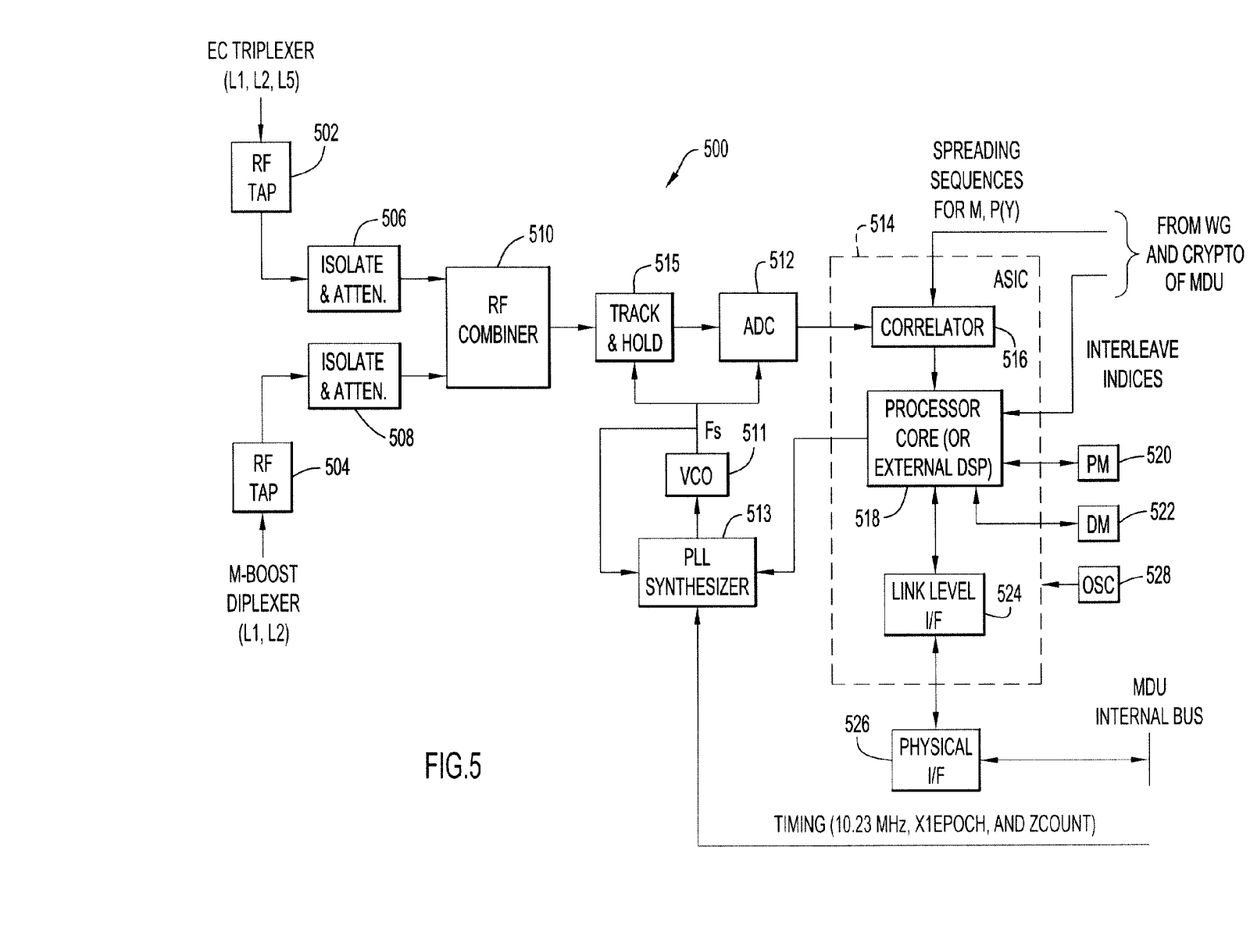
FIG. 5 is a functional block diagram showing components of an example IMS.

FIG. 5 is a functional block diagram showing hardware components of an example IMS 500. As shown at the left, RF signals are brought into the IMS from tap-in points as close to the transmit antennas as possible. For example, an RF tap 502 is arranged at the output of the triplexer that feeds the earth coverage antenna. This tap point supplies to the IMS a portion of the transmitted GPS signals that are the L1, L2, and L5 bands. Another RF tap 504 is arranged at the output of the diplexer that feeds the M-Code boosting antenna. This tap point supplies to the IMS a portion of the transmitted GPS M-code signals that are in the L1 and L2 bands. As previously described, these tapped-off signals are processed and ultimately used to evaluate signal distortion and also data faults.

The signals from RF taps 502 and 504 are respectively fed through circuitry 506 and circuitry 508 that isolate the triplexer and diplexer from any contaminating signals coming from the IMS, and that also attenuate the signal levels to protect the IMS hardware from potential damage. The signals from the different antennas are then summed together in an RF combiner 510.

The RF signals must be converted to digital form before they can be processed in the correlator. This is done using an analog-to-digital converter (ADC) 512. As described below in greater detail, the L-band signals are under-sampled to directly modulate them to a low IF frequency. The ADC 512 must have sufficient bandwidth to accommodate the highest-frequency L-band signal (L1, at 1575.42 MHz). This requirement may not be problematic for a 1-bit ADC, but if a multiple-bit ADC is used, the ADC 12 can be preceded by a track-and-hold amplifier 515 as necessary.

The sampling rate $F_S$ of ADC 512 is controlled by a voltage controlled oscillator (VCO) 511 whose frequency is selected by a PLL synthesizer 513 in accordance with the output of the correlator, a timing signal from the MDU, and feedback from the output of VCO 511.

A baseband digital signal processing device 514 can be implement in an ASIC or an FPGA, for example, and includes the correlator 516. For each signal of interest, correlator 516 calculates the complex correlation between the transmitted RF signal and the spreading sequence specific to the signal of interest. Many of the spreading sequences are generated by cryptographic logic. One of the key simplifications of the IMS is that the IMS uses the same spreading sequences that were used in the transmitter to generate the signals. Consequently, a separate set of cryptographic logic is not needed in the IMS. A possible objection to this approach is that the IMS would not be able to discern if the space vehicle were transmitting an erroneous cryptographic spreading sequence. While this is true, a fault of this nature does not produce MSI, because the user equipment receiving the signal would not be able to de-spread the signal and therefore could not be misled by it. The correlation signal processing is described below in greater detail.

Figure 6:
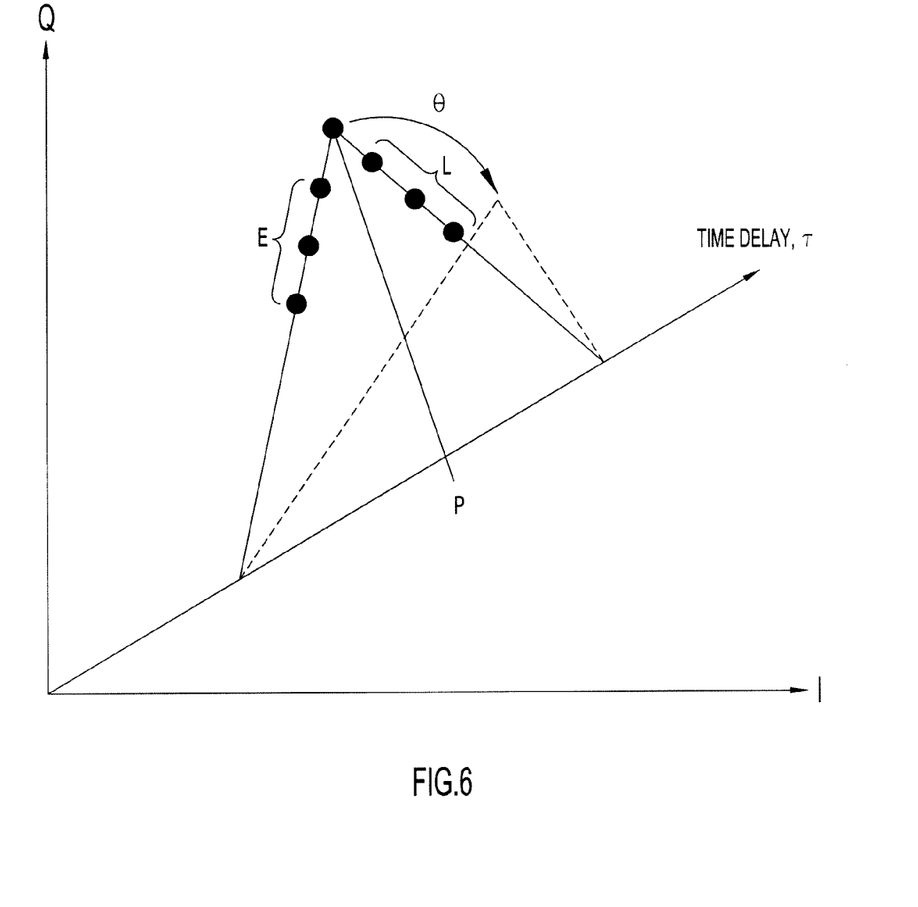
FIG. 6 is a graph showing an example of a complex output from a correlator.

The output of correlator 516 is a complex (i.e., in-phase, I, and quadrature, Q) correlation "triangle" for each signal of interest that is being transmitted. As shown in FIG. 6, the IMS computes seven points on the correlation triangle, one prompt (P), three early (E), and three late (L). As described previously, these correlator outputs become inputs to the SQM algorithms 460 (FIG. 4) and are used for data demodulation 310 (FIGS. 3 and 4). Very small changes in the time delay of signals, which are difficult to observe by movement of the correlation triangle, are readily apparent because they will cause the triangle to rotate in the complex plane by an angle θ. A complete rotation of 360° corresponds to a difference in time delay of one cycle of the carrier frequency. For example, at the L1 frequency of 1575.42 MHz, a complete rotation would correspond to 635 picoseconds.

Referring again to FIG. 5, the complex correlation results are sent to a processor 518. Processor 518 can be implemented in various forms, e.g., a core on the ASIC or FPGA, an external digital signal processor, etc. Processor 518 can be equipped with its own program memory (PM) 520 and data memory (DM) 522, either or both of which can be internal to the ASIC or FPGA or else located externally. Processor 518 connects to the internal bus of the satellite payload Mission Data Unit (MDU) via an appropriate link-level interface 524 and physical-layer interface 526.

Upon receiving the complex correlation results from correlator 516, processor 518 performs the following operations:
1) compute the absolute values of the complex correlation points and average them for input to the SQM algorithms.
2) compute the phase angles of the correlation points (particularly the prompt values). This can be done, for example, by taking the arctangent of Q/I.
3) average the phase angles in order to determine any small changes in time delay.
4) look for instantaneous phase shifts of about 180°. These phase shifts correspond to the data bits being transmitted via BPSK modulation of the spreading sequence.

Once processor 518 has detected the data bits it also performs other necessary functions, which can include forward error correction (FEC) or de-interleaving. The de-interleaving is based on interleave indices received from the Waveform Generator (WG) (this is also indicated by the demodulate data operation 310 shown in FIG. 4). The final processed data bits are then examined for data errors in operation 300 (FIG. 3) in the manner described previously. As indicated by the block labeled OSC 528 in FIG. 5, the MDU also supplies the necessary phase signals to processing device 514 to permit processor 518 to perform the clock integrity monitoring, as described in connection with FIG. 2 above.

The approach used for the IMS is direct digitization of the composite L1, L2, and L5 signal, with the sampling frequency chosen so as to alias all three input bands to a low IF band for further processing. Generally, this aliasing technique would not be performed in a receiver that receives GPS signals that were actually transmitted over the air, because this technique would also alias considerable thermal noise into the digital signal, and the GPS signals are typically well below noise even without such an increase in noise. Here, because the IMS receiver is co-located with the transmitter, the RF signal is very strong. The IMS processes a portion of the RF signal tapped off at point just prior to transmission, resulting in a pure signal that is essentially free of thermal noise in all of the bands being aliased. Consequently, a single A/D converter can be used to sample all of the bands, resulting in a simplified IMS receiver.

Figure 7A:
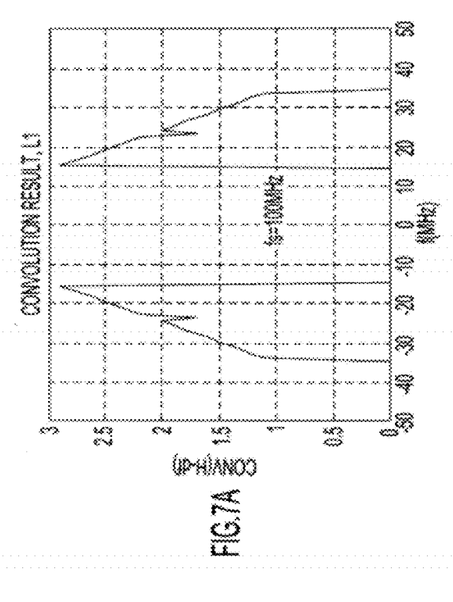
FIGS. 7a-7d are graphs of the low IF L1, L2, and L5 band signals, and the aliased composite signal (L1, L2, and L5), respectively, resulting from under-sampling of the RF broadcast signal using a single A/D converter.
Figure 7B:
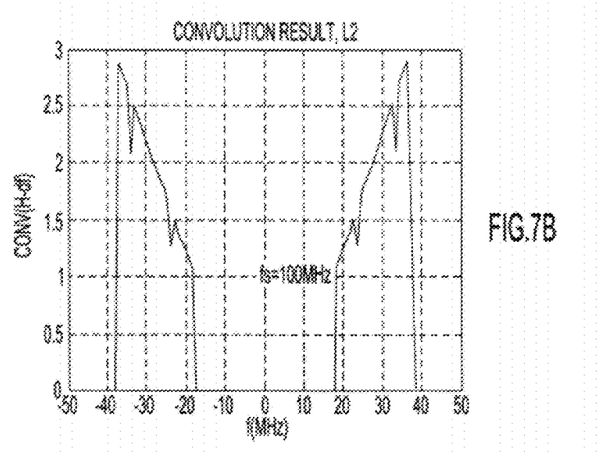
Figure 7C:
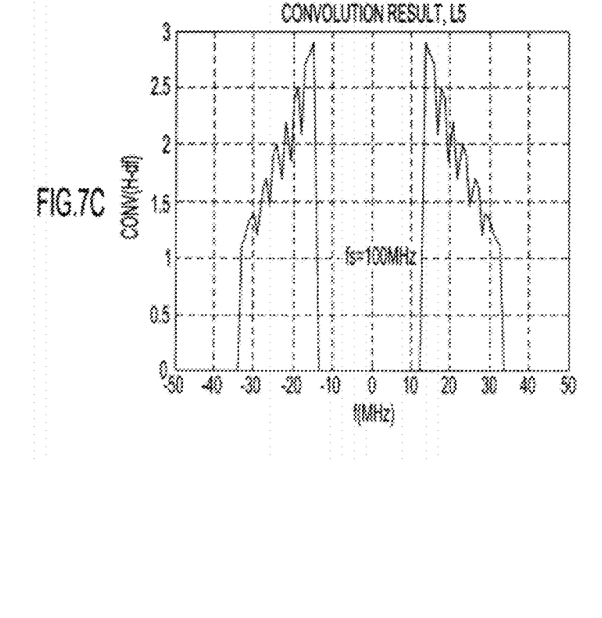
Figure 7D:
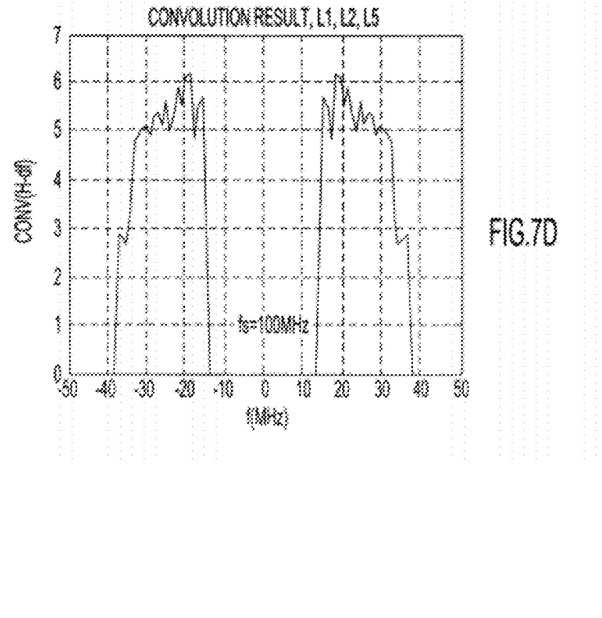

FIGS. 7A-7D show an example frequency plan for the IMS. The L1, L2, and L5 bands are respectively shown schematically in FIGS. 7A-7C by shapes with one, two, and five notches on their top sloped edges. For a sampling frequency of 100 MHz, the L1 band aliases to a center frequency of about 25 MHz (FIG. 7A), L2 to 27 MHz (FIG. 7B), and L5 to 24 MHz (FIG. 7C). The composite of all three bands generated by the ADC is centered at about 25 MHz (FIG. 7D). Note the frequency reversal on signal L2, which can be taken into account during the mixing to baseband described below. Thus, by under-sampling, the entire band of the GPS L1, L2, and L5 signals is aliased down to one band with a single A/D converter, and then the individual signals are extracted from then composite digital signal using separate codes for each of the bands.

Figure 8:
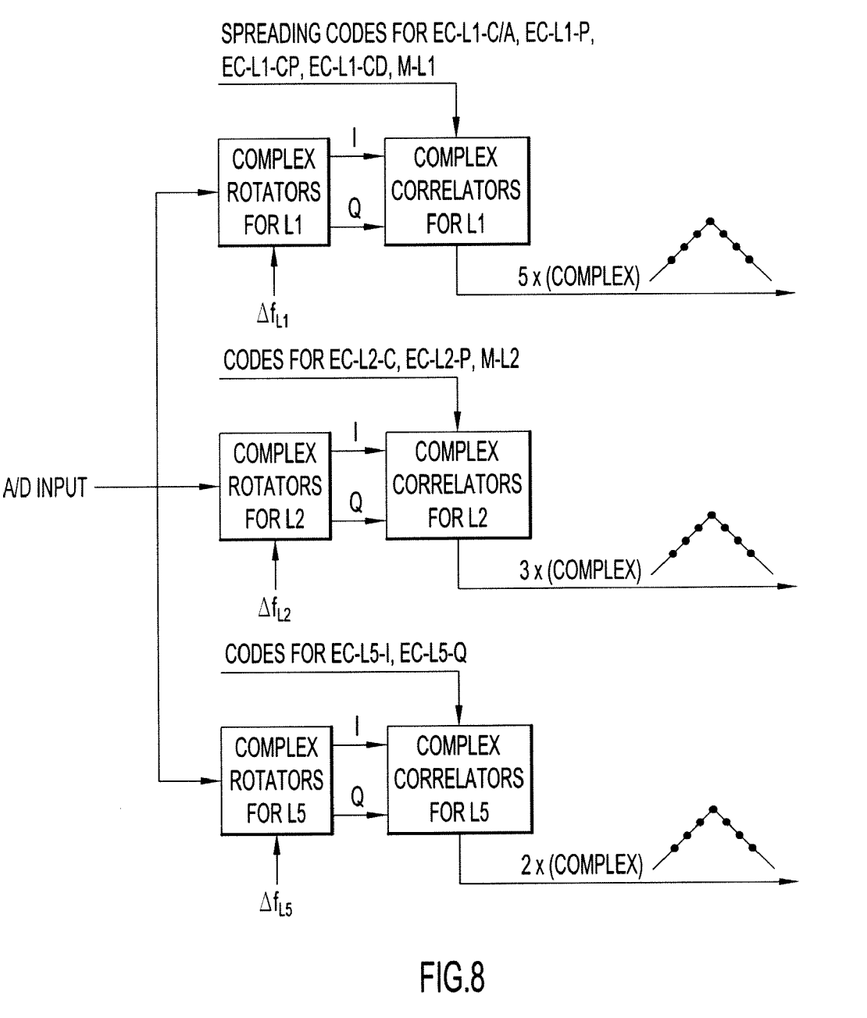
FIG. 8 is a functional block diagram illustrating correlation processing for the IMS.

FIG. 8 shows the correlation signal processing in the IMS to extract the individual signals from the composite, aliased digital signal. Essentially, the under-sampling by the A/D converter brings the RF signals down close to baseband (a low IF frequency). Prior to correlation, the aliased, low IF signal is mixed to baseband via complex rotators. In particular, the composite output signal from the A/D converter is supplied to L1 band complex rotators, which mix the composite signal with sine and cosine phases of a frequency signal $\Delta f_{L1}$ to produce baseband I and Q signals. The frequency of the input mixing signal $\Delta f_{L1}$ is selected to down-convert to baseband the L1 band signals within the composite signal, which are at a particular center IF frequency, in this example, 25 MHz. The composite output signal from the A/D converter is also supplied to L2 band complex rotators, which mix the composite output signal with a frequency signal $\Delta f_{L2}$ that down-converts the L2 band signals within the composite signal (at a center frequency of 27 MHz in this example) to produce baseband I and Q signals. Likewise, the composite output signal from the A/D converter is supplied to L5 band complex rotators, which mix the composite output signal with a frequency signal $\Delta f_{L5}$ that down-converts the L5 band signals within the composite signal (at a center frequency of 24 MHz in this example) to produce baseband I and Q signals.

The required number of bits in the sine and cosine mixing inputs will vary according to the quantization of the A/D input, i.e., from one-bit to many bits, depending on the accuracy of the correlation energy levels that is desired. Note that in the IMS, the GPS signals are extremely clean; they are not below the thermal noise floor as in most GPS receivers. Therefore, quantization effects have to be considered, and multiple bits are required in the A/D converter if relative energies of different signals are to be compared.

Separate correlations are performed for every signal of interest. For example the L1 path in FIG. 8 shows separate correlations for the Earth Coverage Antenna (EC) L1 C/A-code, EC L1 P-code, EC L1 CP-code, EC L1 CD-code, and M-Code Boost Antenna L1 M-code, for a total of 5 complex correlation outputs. The L2 path includes separate correlations for the EC L2 C-code, EC L2 P-code, and M-L2 code for a total of three complex correlation outputs. The L2 path includes separate correlations for the EC L5 I code and the EC L5 Q code, for a total of two complex correlation outputs.

As shown in FIG. 8, the outputs of the complex correlators, ten in total, are ideally in the shape of the correlation triangle. If any of the signals is distorted, the correlation output deviates from the expected correlation triangle shape, which can be detected by the signal quality checks previously described. Again, this is advantageous, because signal distortions can be detected immediately at the transmitter and corrected before significant errors develop within receiver devices on the ground.

In the context of a satellite navigation space vehicle, such as a GPS satellite, the IMS is preferably designed to be as compact, low-power, and low-cost as possible. By employing a simplified RF front end, avoiding use of an independent timing reference and crypto and code generators, and checking data without requiring state vector propagation, the IMS can meet these design requirements while still providing all the necessary on-board integrity monitoring for the space vehicle. For example, the IMS can be contained on a single board, such as single card that mounts in a card slot in the MDU within the housing of the space vehicle.

The integrity monitoring system described above can also be used to track the group delay variation (GDV) of each transmitted signal relative to the space vehicle system clock. Ideally, the GPS satellite transmits all of the GPS signals at the same time or as close in time as possible. Even in an ideal case, signals in the different frequency bands (L1, L2, L5) will arrive at a ground receiver at slightly different times, because atmospheric effects, such as ionospheric delays, are frequency dependent and cause different delays in signals of different frequency. At the ground receiver, it is difficult to determine whether this delay variation results strictly from atmospheric effects or is also due to transmission timing offsets at the transmitter. Further, a typical receiver may have separate A/D converters for each band, resulting in a different delay for each path, making it more difficult to isolate delay variations.

The described IMS can track GDV with very high accuracy via the phase angle of the correlation triangle. More specifically, because the receiver of the IMS employs a single A/D converter to sample all three bands, resulting in a single signal path in the receiver, all of the GPS signals have exactly the same delay in the IMS receiver. Thus, the relative delays or shifts in delays between the different bands can be determined precisely by evaluating the timing offsets of the peaks of the output correlation signals. Since GDV is a major contributor to User Range Error, measurements of GDV can be communicated to the user equipment to increase ranging accuracy, or GDV measurements can be used as part of a closed loop feedback system to control and reduce the GDV before the signal is transmitted by the space vehicle.

While the integrity monitoring system has been described in the context of on-board monitoring, it will be appreciated that the integrity monitoring system can be implemented in test equipment for production testing of many of the GPS payload components, including the MDU, Time Keeping Subsystem (TKS), and L-Band transmitters. In this context, the IMS functions in a manner similar to other GPS test receivers; however, due to the simplicity of the IMS, it can reduce test equipment expenses.

Having described preferred embodiments of a new and improved integrity monitoring system, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. An integrity monitoring system for monitoring the integrity of signals in a transmitter system, the integrity monitoring system comprising:
   a receiver configured to receive a tapped-off portion of a locally generated multi-band RF signal, the receiver comprising: an analog-to-digital (A/D) converter configured to sample the multi-band RF signal to generate a composite digital signal; and a plurality of correlators configured to extract a respective plurality of signals from the composite digital signal by respectively correlating the composite digital signal with a plurality of spreading codes;
   a signal integrity module configured to identify signal distortions in the signals extracted by the receiver; and
   a data integrity module configured to detect data errors from the signals extracted by the receiver.

2. The integrity monitoring system of claim 1, wherein the composite digital signal is a composite intermediate frequency (IF) digital signal at the output of the A/D converter, the receiver further comprising:
   a plurality of phase rotators respectively corresponding to a plurality of bands in the composite IF digital signal, each phase rotator respectively being configured to down-convert the composite IF digital signal such that the phase rotator's corresponding band in the composite IF digital signal is brought to baseband, wherein the plurality of correlators receive the composite digital signal after conversion to baseband by the phase rotators.

3. The integrity monitoring system of claim 1, wherein the A/D converter is configured to under-sample the multi-band RF signal such that a plurality of bands in the multi-band RF signal are aliased at an intermediate frequency (IF) in the composite digital signal.

4. The integrity monitoring system of claim 1, wherein the data integrity module detects data errors in data uploaded to the transmitter system and data errors present in the signals extracted from the multi-band RF signal.

5. The integrity monitoring system of claim 1, wherein the spreading codes are supplied to the integrity monitoring system by the transmitter system.

6. The integrity monitoring system of claim 1, wherein the integrity monitoring system is configured to employ cryptographic code information supplied by the transmitter system.

7. The integrity monitoring system of claim 1, further comprising a timing integrity module configured to monitor the integrity of clock signals of the transmitter system without use of an independent timing reference.

8. The integrity monitoring system of claim 7, wherein the integrity monitoring system is configured to receive clock phase signals from a time keeping system of the transmitter system and to identify clock errors by comparing phase errors, phase velocity errors, and phase acceleration errors with threshold values.

9. The integrity monitoring system of claim 1, wherein the integrity monitoring system is configured to be located within a housing of the transmitter system.

10. The integrity monitoring system of claim 1, wherein the integrity monitoring system is disposed on a single circuit card that is configured to be mounted in a card slot within the transmitter system.

11. The integrity monitoring system of claim 1, wherein the integrity monitoring system is configured to be disposed in test equipment external to the transmitter system.

12. The integrity monitoring system of claim 1, wherein the transmitter system is a satellite navigation space vehicle.

13. A method of monitoring the integrity of signals in a transmitter system, the method comprising:
    receiving a tapped-off portion of a locally-generated multi-band RF signal;
    sampling the multi-band RF signal to generate a composite digital signal;
    extracting a plurality of signals from the composite digital signal by correlating the composite digital signal with a respective plurality of spreading codes;
    evaluating the extracted signals for signal distortions; and
    evaluating the extracted signals for data errors.

14. The method of claim 13, wherein the sampling produces a composite intermediate frequency (IF) digital signal, the method further comprising:
    supplying the composite IF digital signal to a plurality of phase rotators respectively corresponding to a plurality of bands in the composite IF digital signal,
    down-converting the composite IF digital signal with each of the phase rotators such that each phase rotator's corresponding band in the composite IF digital signal is brought to baseband, wherein the composite digital signal is correlated after conversion to baseband by the phase rotators.

15. The method of claim 13, wherein the sampling under-samples the multi-band RF signal such that a plurality of bands in the multi-band RF signal are aliased at an intermediate frequency (IF) in the composite digital signal.

16. The method of claim 13, wherein evaluating the extracted signals for data errors includes detecting data errors in data uploaded to the transmitter system and data errors present in the extracted signals.

17. The method of claim 13, further comprising:
    performing timing integrity monitoring of clock signals of the transmitter system without use of an independent timing reference.

18. The method of claim 17, wherein the timing integrity monitoring includes receiving clock phase signals from a time keeping system of the transmitter system and identifying clock errors by comparing phase errors, phase velocity errors, and phase acceleration errors with threshold values.

19. An integrity monitoring system for monitoring the integrity of signals in a transmitter system, the integrity monitoring system comprising:
    a receiver configured to extract previously-broadcast position and clock data from a previously-broadcast, locally-generated RF signal;
    a processor configured to:
        receive position and clock data uploaded at a current upload time;
        evaluate the previously-broadcast position and clock data at the current upload time;
        compare the uploaded position and clock data to the previously-broadcast position and clock data evaluated at the current upload time to determine whether the uploaded position or clock data is erroneous.

20. The integrity monitoring system of claim 19, wherein:
    the receiver is further configured to extract currently-broadcast position and clock data from a currently-broadcast, locally-generated RF signal, the currently-broadcast position and clock data having been generated by propagating forward the uploaded position and clock data from the current upload time to the current broadcast time; and the processor is further configured to:

evaluate the previously-broadcast position and clock data at the current broadcast time; and compare the currently-broadcast position and clock data to the previously-broadcast position and clock data evaluated at the current broadcast time to determine whether the currently-broadcast position or clock data is erroneous.

21. The method of claim 20, wherein the processor is further configured to:

convert the previously-broadcast position data evaluated at the current upload time from Keplerian terms to Cartesian coordinates prior to comparison with the uploaded position data; and convert the previously-broadcast position data evaluated at the current broadcast time and the currently-broadcast position data from Keplerian terms to Cartesian coordinates prior to comparison with each other.

22. A method for monitoring the integrity of position and clock data, comprising:

receiving uploaded position and clock data at a current upload time;

extracting previously-broadcast position and clock data from a previously-broadcast, locally-generated RF signal;

evaluating the previously-broadcast position and clock data at the current upload time;

comparing the uploaded position and clock data to the previously-broadcast position and clock data evaluated at the current upload time to determine whether the uploaded position or clock data is erroneous;

extracting currently-broadcast position and clock data from a currently-broadcast, locally-generated RF signal, the currently-broadcast position and clock data having been generated by propagating forward the uploaded position and clock data from the current upload time to the current broadcast time;

evaluating the previously-broadcast position and clock data at the current broadcast time; and comparing the currently-broadcast position and clock data to the previously-broadcast position and clock data evaluated at the current broadcast time to determine whether the currently-broadcast position or clock data is erroneous.

23. The method of claim 22, wherein:

the previously-broadcast position data evaluated at the current upload time is converted from Keplerian terms to Cartesian coordinates prior to comparison with the uploaded position data; and the previously-broadcast position data evaluated at the current broadcast time and the currently-broadcast position data are converted from Keplerian terms to Cartesian coordinates prior to comparison with each other.

24. A computer readable medium storing instructions, that when executed by a computer, cause the computer to perform functions of:

receiving uploaded position and clock data at a current upload time;

receiving previously-broadcast position and clock data extracted from a previously-broadcast, locally-generated RF signal;

evaluating the previously-broadcast position and clock data at the current upload time;

comparing the uploaded position and clock data to the previously-broadcast position and clock data evaluated at the current upload time to determine whether the uploaded position or clock data is erroneous;

receiving currently-broadcast position and clock data extracted from a currently-broadcast, locally-generated RF signal, the currently-broadcast position and clock data having been generated by propagating forward the uploaded position and clock data from the current upload time to the current broadcast time;

evaluating the previously-broadcast position and clock data at the current broadcast time; and comparing the currently-broadcast position and clock data to the previously-broadcast position and clock data evaluated at the current broadcast time to determine whether the currently-broadcast position or clock data is erroneous.

* * * * *